May 14, 1957  A. A. SCHREINER  2,792,057
DEVICE FOR MOUNTING TUBELESS TIRES
Filed May 25, 1955
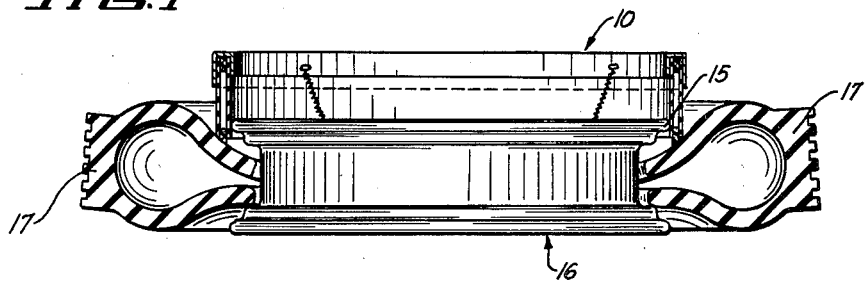
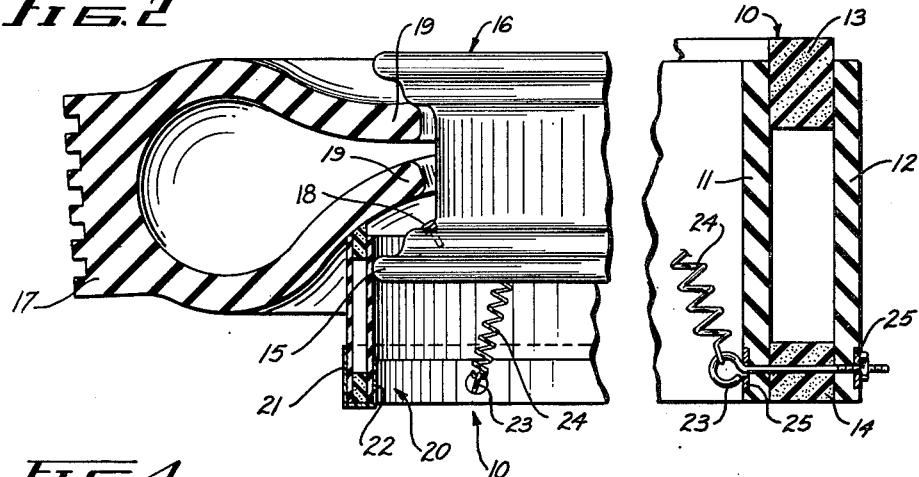
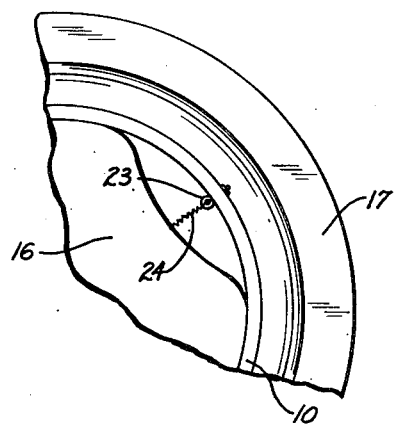
INVENTOR.
ALEXANDER SCHREINER
BY
*Frank Makara*
ATTORNEY 2,792,057

DEVICE FOR MOUNTING TUBELESS TIRES

Alexander Anthony Schreiner, Union, N. J.

Application May 25, 1955, Serial No. 511,053

3 Claims. (Cl. 157—1.1)

This invention relates to a device for mounting tubeless tires.

It is an object of this invention to provide an inexpensive and efficient device for mounting tubeless tires.

It is another object to provide a mounting device easily manipulated by one man.

It is another object to provide a mounting device which does not require a mounting stand.

These and other objects of this invention will become apparent upon reading the following descriptive disclosure taken in conjunction with the accompanying drawing in which:

Fig. 1 is a section view through a tubless tire, steel wheel and the mounting device, Fig. 2 is a detailed section view of Fig. 1, Fig. 3 is a section of a modified mounting device and Fig. 4 is a top view broken away in part and showing the manner of hooking the mounting device to the wheel.

Feferring to the drawing a mounting device 10 in the form of a cylinder is provided with a pair of semi-rigid resilient walls, for example, of thick gauge rubber, namely an inner cylindrical wall 11 and an outer wall 12.

The walls 11 and 12 are spaced-apart by means of a sponge bottom rubber ring 13 and a top sponge rubber ring 14 of the same width.

In using the mounting device 10, the inner wall 11 is disposed over the rim 15 of a steel wheel 16 in close hermetically sealed relationship thereto (Fig. 2). A tubeless tire 17 previously loosely disposed on the wheel has the tire wall closest to the sponge rubber 13 brought in hermetic contact thereto. As shown in Fig. 3 the walls 11 and 12 are disposed below the outer surface of rubber ring 13. In other words the rubber ring protrudes beyond both walls 11 and 12 preferably the same distance, but a protrusion of ring 13 where one wall is of greater or lesser height than the other is operable.

The mounting device is preferably placed upon the top of the wheel, but as shown in Fig. 2 the device may be placed on the floor and the tire and rim placed thereupon.

In either case the mounting device is disposed hermetically between the tire 17 and the wheel rim 15 in an airtight manner thereby enabling entrapment of compressed air through conventional tire valve 18 welded to the wheel 16.

As the air fills tire 16 the mounting device 10 is pushed outwardly and the tire beads 19 become seated against their respective wheel rim wall.

To effect rigid construction of the mounting device a U-shaped channel member 20 is used. Preferably channel member 20 is provided with a longer outside leg section 21 than the inner leg section 22. The channel member 20 is provided with four apertures to which eye bolts 23 are secured. Conventional coil springs 24 having conventional hook ends are secured to the eye bolts and are engageable with the edges of apertures in a wheel 16, thereby holding the mounting device firmly against both the wheel rim 15 and tire 17.

Fig. 3 shows a modified device wherein the channel member is replaced by a pair of washers 25 at each of the four apertures adapted to receive eye bolts 23.

The mounting device 10 is of relatively light weight so that it can be easily handled by one man. After the four springs 24 are hooked within the wheel apertures of steel wheel 16, the compressed air line is hooked to air valve 18 by the operator whose hands are free for such use.

This invention has been described by means of a plurality of embodiments thereof but it is not to be limited to these embodiments.

I claim:

1. Apparatus for inflating and mounting a tubeless tire on a tire rim when one of the beads fails to make sealing contact with the corresponding rim seating surface, comprising pressure resistant means adapted to span the gap between said rim and the exterior surface of said tire sidewall including means for making sealing contact with the exterior surface of said tire intermediate said bead and the tread portion of said tire and with said rim to form a closed chamber including the interior of said tire, said chamber enclosing a radially inward portion of said exterior surface of said tire sidewall and leaving a substantial area of the radially outward portion of said exterior surface exposed to the atmosphere, whereby when fluid under pressure is admitted to said chamber, unbalanced fluid pressure forces are imposed on said sidewall to move said sidewall and its bead toward contact with said rim, said last named means being yieldable to permit movement of said sidewall, said pressure resistant means comprising a pair of spaced-apart concentric walls separated at one end by a protruding sponge rubber ring secured fixedly to said concentric walls and adapted to contact said tire sidewall in fluid tight relationship.

2. The apparatus of claim 1 having a second spacer ring secured fixedly between said concentric walls at the other end thereof to keep the walls apart a distance equal to that of the said sponge rubber ring.

3. The apparatus of claim 2 having a plurality of spaced-apart coil springs secured at one end to said concentric walls at the concentric wall end disposed away from the concentric wall ends holding the sponge rubber ring, said coil springs having hook means on its unsecured end adapted for hooking engagement with said tire rim.

References Cited in the file of this patent

UNITED STATES PATENTS

| | | |
|---|---|---|
| 2,023,975 | Qualey | Dec. 10, 1935 |
| 2,304,581 | Lyon | Dec. 8, 1942 |
| 2,394,290 | Butler | Feb. 5, 1946 |
| 2,538,759 | Briggs | Jan. 23, 1951 |
| 2,673,481 | Hanson | Mar. 30, 1954 |